(12) United States Patent
Ugawa et al.

(10) Patent No.: US 8,546,042 B2
(45) Date of Patent: Oct. 1, 2013

(54) MEMBRANE ELECTRODE ASSEMBLY AND POLYMER ELECTROLYTE FUEL CELL

(75) Inventors: Kohei Ugawa, Ibaraki (JP); Hiroshi Kashino, Ibaraki (JP); Norihisa Yoshimoto, Ibaraki (JP); Shoji Saibara, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 693 days.

(21) Appl. No.: 12/440,192

(22) PCT Filed: Sep. 13, 2007

(86) PCT No.: PCT/JP2007/067882
§ 371 (c)(1),
(2), (4) Date: Mar. 5, 2009

(87) PCT Pub. No.: WO2008/032802
PCT Pub. Date: Mar. 20, 2008

(65) Prior Publication Data
US 2010/0183943 A1    Jul. 22, 2010

(30) Foreign Application Priority Data

Sep. 13, 2006  (JP) ................. 2006-248519
Oct. 2, 2006   (JP) ................. 2006-270332
Mar. 27, 2007  (JP) ................. 2007-080409
Sep. 3, 2007   (JP) ................. 2007-227464

(51) Int. Cl.
*H01M 4/86*    (2006.01)
*H01M 4/90*    (2006.01)
*H01M 4/92*    (2006.01)
*H01M 4/96*    (2006.01)
*H01M 8/10*    (2006.01)

(52) U.S. Cl.
USPC ................. 429/483; 429/485; 429/231.4

(58) Field of Classification Search
USPC ..................... 429/483, 485, 231.4
See application file for complete search history.

(56) References Cited

U.S. PATENT DOCUMENTS 5,189,005 A     2/1993   Watanabe et al.
7,625,659 B2 *  12/2009  Daimon et al. ............... 429/483
(Continued)

FOREIGN PATENT DOCUMENTS

CN     1784616 A     6/2006
CN     101167211 A   4/2008
(Continued)

OTHER PUBLICATIONS

Chinese Office Action dated Sep. 10, 2010 for Application No. 200780033539.5.
(Continued)

*Primary Examiner* — Brian P Mruk
(74) *Attorney, Agent, or Firm* — Birch, Stewart, Kolasch & Birch, LLP

(57) ABSTRACT

In a membrane electrode assembly of the present invention, at least one of a catalyst layer of an oxygen electrode and a catalyst layer of a fuel electrode includes a supported catalyst supporting a metal catalyst containing a platinum group element, a proton conductive polymer electrolyte, and at least one selected from (a) a complex-forming agent having a ligand that forms coordinate bonds with ions of the platinum group element and forms a complex, the ligand containing oxygen as a coordinating atom, (b) a complex of the platinum group element, a ligand of the complex containing oxygen as a coordinating atom, and (c) carbon that has a BET specific surface area of 100 m$^2$/g or greater, satisfies at least one of (i) an R value of Raman spectrum of 0.5 or less and (ii) a lattice spacing $d_{002}$ between (002) planes of 0.35 nm or less, and does not support the metal catalyst. With the use of the membrane electrode assembly of the present invention, it is possible to provide a polymer electrolyte fuel cell that has high durability and a long service life.

13 Claims, 3 Drawing Sheets

(56) References Cited

U.S. PATENT DOCUMENTS

| | | |
|---|---|---|
| 2001/0038937 A1 | 11/2001 | Suzuki et al. |
| 2002/0051903 A1 | 5/2002 | Masuko et al. |
| 2003/0008196 A1 | 1/2003 | Wessel et al. |
| 2006/0099488 A1* | 5/2006 | Daimon et al. ............ 429/44 |
| 2006/0286361 A1 | 12/2006 | Yonetake |
| 2007/0224479 A1* | 9/2007 | Tadokoro et al. ............ 429/30 |
| 2008/0191161 A1 | 8/2008 | Behl et al. |

FOREIGN PATENT DOCUMENTS

| | | |
|---|---|---|
| JP | 6-176766 A | 6/1994 |
| JP | 2000-30715 A | 1/2000 |
| JP | 2000-268828 A | 9/2000 |
| JP | 2000-273351 A | 10/2000 |
| JP | 2002-329500 A | 11/2002 |
| JP | 2003-86187 A | 3/2003 |
| JP | 2003-86188 A | 3/2003 |
| JP | 2003-109643 A | 4/2003 |
| JP | 2005-26207 A | 1/2005 |
| JP | 2005-317467 A | 11/2005 |
| JP | 2005-332807 A | 12/2005 |
| JP | 2006-4916 A | 1/2006 |
| JP | 2006-40767 A | 2/2006 |
| JP | 2006-147345 A | 6/2006 |
| WO | WO-01/92151 A1 | 12/2001 |
| WO | WO 2005/104275 A1 | 11/2005 |

OTHER PUBLICATIONS

Japanese Office Action of corresponding Japanese Patent Application No. 2008-513860, mailed on Dec. 8, 2011.
Chinese Office Action for Chinese Application No. 201110075627.X dated Apr. 17, 2013.
English machine translation of JP-2006-4916-A, dated Jan. 5, 2006.

* cited by examiner

Oxygen electrode catalyst layer | Polymer electrolyte membrane

Oxygen electrode catalyst layer | Polymer electrolyte membrane

Oxygen electrode catalyst layer | Polymer electrolyte membrane

MEMBRANE ELECTRODE ASSEMBLY AND POLYMER ELECTROLYTE FUEL CELL

TECHNICAL FIELD

The present invention relates to a membrane electrode assembly that can be used in a polymer electrolyte fuel cell that is usable as a cogeneration system for consumer use, an electric power generator for mobile units such as automobiles, or a portable power source, and a polymer electrolyte fuel cell in which such a membrane electrode assembly is used.

BACKGROUND ART

A polymer electrolyte fuel cell generates electricity and heat simultaneously through an electrochemical reaction that occurs on a metal catalyst by supplying a fuel gas such as hydrogen to an anode (fuel electrode) and oxygen in the air to a cathode (oxygen electrode). The polymer electrolyte fuel cell has features such as capability of operating at low temperatures from room temperature up to 100° C., rapid start-up/shutdown, and securing a high output density. For this reason, much attention has been paid to the Polymer electrolyte fuel cell as a potential fuel cell for applications such as a cogeneration system for consumer use, an electric power generator for mobile units such as automobiles, or a portable power source.

Typically, electrodes of a polymer electrolyte fuel cell include a supported catalyst in which a catalyst, such as fine platinum particles, is supported on a support (such as carbon: carbon black, etc.) to form. However, a problem of output reduction arises when operated for a long period of time. The cause for the output reduction is presumed to be due to a decrease in electrochemical surface area of the catalyst caused by leaching of platinum serving as a catalyst, a resistance increase in the polymer electrolyte membrane, and a decrease in electrical conductivity caused by oxidation of carbon serving as a support.

In a polymer electrolyte fuel cell, the catalyst layer of the oxygen electrode is particularly exposed to superacid (protons in the electrode) and a high potential, and as a result, the metal catalyst is oxidized and leaches out. Some of the leached catalyst ions deposit on the surface of undissolved metal catalyst, causing grain growth of the fine catalyst particles. Because they deposit alone without coming into contact with carbon (support) serving as a conductor, they cannot be involved in the reaction in the electrode. This decreases the catalyst's electrochemical surface area (catalyst's effective area) that contributes to the reaction, causing a problem in that the fuel cell output cannot be maintained. Other leached catalyst metal ions diffuse through to the polymer electrolyte membrane, where they deposit, which constitutes a major contributing factor for the increase of membrane resistance.

In order to suppress the aforementioned decrease of catalyst electrochemical surface area, the use of an alloy, such as PtCo, as a metal catalyst has been proposed, and an investigation has been made to improve durability by suppressing the platinum leaching by turning platinum into an alloy (Patent Document 1). Similarly, in order to suppress the leaching of platinum from a catalyst layer to improve durability, the incorporation of a material that forms a planar mononuclear complex with platinum ions in the catalyst layer as a platinum ion capturing agent has been proposed (Patent Document 2). These methods can suppress the decrease of catalyst electrochemical surface area caused by the dissolution of platinum and the diffusion of leached platinum ions into the polymer electrolyte membrane to some extent. However, a sufficient suppression effect has not yet been obtained, and a catalyst layer with a long service life has not yet been achieved.

In order to prevent the problem of carbon serving as a support being exposed to a high potential, and as a result being oxidized and destroyed, the use of carbon with superior corrosion resistance as a catalyst support has been proposed (Patent Document 3). Furthermore, the incorporation of conductive carbon that supports no catalyst in a catalyst layer has also been proposed (Patent Document 4). These methods can suppress the electrical conductivity reduction of the catalyst layer, a decrease in reaction gas diffusibility caused by changes in the pore diameter of the catalyst layer, and so on, but they cannot suppress the dissolution of the catalyst.

Patent Document 1: JP H6-176766A
Patent Document 2: JP 2006-147345A
Patent Document 3: JP 2000-268828A
Patent Document 4: JP 2006-4916A

DISCLOSURE OF INVENTION

The present invention has been conceived in view of the problems encountered in the aforementioned conventional technology, and a first object of the present invention is to suppress the oxidization and leaching of the metal catalyst in a catalyst layer or to prevent leached catalyst metal ions from depositing on the polymer electrolyte membrane.

A second object of the present invention is to cause leached catalyst metal ions to deposit in a catalyst layer so that the ions can be involved in the electrochemical reaction again.

The present invention attempts to realize a polymer electrolyte fuel cell with a long service life by achieving at least one of the objects mentioned above.

A first membrane electrode assembly of the present invention includes: an oxygen electrode including a catalyst layer for reducing oxygen, a fuel electrode including a catalyst layer for oxidizing fuel, and a polymer electrolyte membrane interposed between the oxygen electrode and the fuel electrode, wherein at least one of the catalyst layer of the oxygen electrode and the catalyst layer of the fuel electrode includes: a supported catalyst supporting a metal catalyst containing a platinum group element; a proton conductive polymer electrolyte; and at least one selected from (a) a complex-forming agent having a ligand that forms coordinate bonds with ions of the platinum group element and forms a complex, the ligand containing oxygen as a coordinating atom, (b) a complex of the platinum group element, a ligand of the complex containing oxygen as a coordinating atom, and (c) carbon that has a BET specific surface area of 100 m$^2$/g or greater, satisfies at least one of (i) an R value of Raman spectrum of 0.5 or less and (ii) a lattice spacing $d_{002}$ between (002) planes of 0.35 nm or less, and does not support the metal catalyst.

A second membrane electrode assembly of the present invention includes: an oxygen electrode including a catalyst layer for reducing oxygen, a fuel electrode including a catalyst layer for oxidizing fuel, and a polymer electrolyte membrane interposed between the oxygen electrode and the fuel electrode, wherein at least one of the catalyst layer of the oxygen electrode and the catalyst layer of the fuel electrode includes: a supported catalyst supporting a metal catalyst containing a platinum group element; a proton conductive polymer electrolyte; at least one selected from (A) a complex-forming agent having a ligand that forms coordinate bonds with ions of the platinum group element and forms a complex, and (B) a complex of the platinum group element; and (C) carbon that does not support the metal catalyst.

A polymer electrolyte fuel cell of the present invention includes either of the aforementioned first and second membrane electrode assemblies of the present invention.

According to the present invention, it is possible to suppress the metal catalyst of the catalyst layer from leaching or leached catalyst metal ions from depositing in the polymer electrolyte membrane. Alternatively, it is possible to cause leached catalyst metal ions to again contribute to the reaction in the catalyst layer. Thus, the membrane electrode assembly can maintain high power generation performance for a long period of time, and a polymer electrolyte fuel cell that has high durability and a long service life can be provided.

BEST MODE FOR CARRYING OUT THE INVENTION

Figure 1:
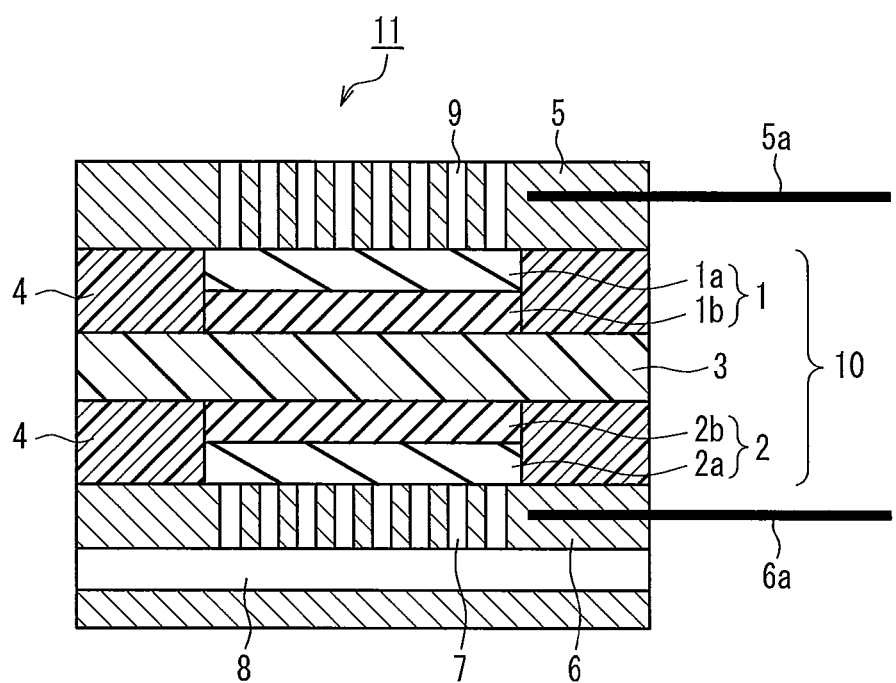
FIG. 1 is a schematic cross-sectional view of an example of a membrane electrode assembly of the present invention and a polymer electrolyte fuel cell including the membrane electrode assembly.

A membrane electrode assembly of the present invention includes an oxygen electrode containing a catalyst layer for reducing oxygen, a fuel electrode containing a catalyst layer for oxidizing a fuel, and a polymer electrolyte membrane interposed between the oxygen electrode and the fuel electrode. At least one of the catalyst layer of the oxygen electrode and the catalyst layer of the fuel electrode contains a supported catalyst supporting a metal catalyst containing a platinum group element, a proton conductive polymer electrolyte, and at least one selected from (A) a complex-forming agent having a ligand that forms coordinate bonds with ions of the platinum group element and forms a complex; (B) a complex of the platinum group element and (C) carbon that does not support the metal catalyst. With this arrangement, it is possible to suppress the performance degradation of the membrane electrode assembly.

As stated earlier, in the catalyst layer of an electrode of a polymer electrolyte fuel cell, a platinum group element constituting the metal catalyst is oxidized by being exposed to superacid and a high potential, and a leaching reaction proceeds gradually. Some of the leached catalyst metal ions deposit on the surface of undissolved metal catalyst, causing grain growth of the fine catalyst particles, or deposit in the catalyst layer without coming into contact with carbon serving as a conductive support, thereby not contributing to the reaction in the electrode. Consequently, the substantial electrochemical surface area of the catalyst that can contribute to the reaction decreases gradually.

There will only be a gradual decrease of the fuel cell's output if only the decrease of the catalyst electrochemical surface area occurs. However, other leached catalyst metal ions diffuse through to the polymer electrolyte membrane, where they will be reduced by a fuel that has crossed over from the fuel electrode (e.g., hydrogen that has permeated through the polymer electrolyte membrane without being involved in the reaction in the fuel electrode and reached the oxygen electrode) and deposit again in the form of a metal. The metal deposited on the polymer electrolyte membrane will not be involved in the reaction of the electrode, and in addition thereto, inhibits the proton conductivity of the membrane, increasing the resistance, and as a result, causing a problem of significant reduction in the fuel cell's output.

In contrast, when (A) a complex-forming agent having a ligand that forms coordinate bonds with platinum group element ions and forms a complex is included in the catalyst layer, leached platinum group element ions, together with the ligand, form a complex. This suppresses the leached catalyst metal ions from migrating to the polymer electrolyte membrane, reducing the amount of metal that deposits in the polymer electrolyte membrane, and it is thus possible to prevent the resistance increase in the membrane. In addition, the effect of preventing leached catalyst metal ions from depositing on the active metal catalyst surface and grain growth of the fine catalyst particles from occurring can also be expected.

Furthermore, with the formation of a complex by the ligand and platinum group element ions, an equilibrium relationship is established between the complex and unleached metal catalyst, and thus the effect of suppressing the leaching of metal catalyst can also be expected. That is, it is considered that, by incorporating a complex-forming agent having a ligand that forms coordinate bonds with ions of a platinum group element constituting a metal catalyst and forms a complex in a catalyst layer, a complex is formed by the following two reactions: (1) a reaction in which the metal catalyst leaches and turns into catalyst metal ions, and (2) a reaction in which a complex is formed by the catalyst metal ions and the ligand, and when these reactions (1) and (2) reach an equilibrium with the reverse reactions thereof, the leaching of the metal catalyst is suppressed. Accordingly, it can be conceived that an effect similar to that obtained with the complex-forming agent is obtained by incorporating (B) a complex of the platinum group element in the catalyst layer in advance, instead of using the complex-forming agent.

The catalyst layer may contain only either the complex-forming agent having a ligand that forms coordinate bonds with ions of the platinum group element and forms a complex or the complex of the platinum group element, or it may contain both. The complex-forming agent having the ligand encompasses, in addition to agents in which a compound itself that constitutes the complex-forming agent functions as a ligand, agents in which part of the compound functions as a ligand through ionization. The platinum group element complex that is formed by the ligand encompasses, in addition to a complex salt, a complex ion.

As the complex-forming agent, both an organic compound and an inorganic compound can be used. Examples of the inorganic compound include a compound having a halogen atom as a coordinating atom, a cyanide such as NaCN, etc. However, there is a possibility that the ligand may adsorb to the fine catalyst particles, and lower the catalyst performance. For this reason, in the present invention, it is preferable to use an organic compound, which is unlikely to cause such a problem.

Examples of the organic compound having a ligand that forms a complex with a platinum group element include: compounds in which at least oxygen is included as an element that acts as a coordinating atom such as acetylacetone and derivatives of acetylacetone (e.g., halogen-substituted acetylacetone such as difluoroacetylacetone, trifluoroacetylacetone and hexafluoroacetylacetone); and compounds in which an atom other than oxygen acts as a coordinating atom, such as dimethyl(1,5-cyclooctadiene), (trimethyl)methylcyclopentadienyl and phthalocyanine. Among those listed above, it is preferable to use a compound having a ligand that contains at least oxygen as a coordinating atom because the addition of only a small amount thereof produces a superior effect. Examples of such a compound include compounds having a carbonyl group, phosphoryl group or carboxyl group. The ligand that contains at least oxygen as a coordinating atom can be what is called a chelating ligand, which has a plurality of coordinating atoms. It is more preferable to use a compound that has a plurality of oxygen atoms as coordinating atoms, but nitrogen, phosphorus or the like may be included as a coordinating atom together with oxygen.

Examples of the compound having a carbonyl group include, in addition to acetylacetone and its derivatives, citric acid, acetyltributyl citrate, ammonium citrate, ethylenediaminetetraacetic acid, nitrilotriacetic acid, hydroxyethyliminodiacetic acid, hydroxyethylethylenediaminetriacetic acid, diethylenetriaminepentaacetic acid, triethylenetetraaminehexaacetic acid, 1,3-propanediaminetetraacetic acid, 1,3-diamino-2-hydroxypropanetetraacetic acid, glycine, dihydroxyethylglycine, tartaric acid, salicylic acid, their derivatives, etc. Particularly, it is preferable to use acetylacetone or its derivatives because they do not lower other properties.

Examples of the compound having a phosphoryl group include hydroxyethylidenediphosphonic acid, nitrilotrismethylenephosphonic acid, phosphonobutanetricarboxylic acid, N,N,N',N'-tetrakis(phosphonomethyl)ethylene diamine, etc.

Examples of the compound having a ligand that contains an atom other than oxygen as a coordinating atom include compounds in which nitrogen acts as a coordinating atom such as 2,2'-bipyridine, terpyridine, 1,10-phenanthroline, triazacyclononane, cyclam, dimethylglyoxime, phthalocyanine, porphyrin and ethylene diamine.

The complex-forming agents listed above may be used alone or in a combination of two or more. The content of the complex-forming agent in the catalyst layer preferably is 1 part by weight or more, and more preferably 5 parts by weight or more, relative to 100 parts by weight of the supported catalyst supporting a metal catalyst, in order to make the effect of the present invention more superior. In order not to lower the power generation performance, 50 parts by weight or less is preferable, and more preferably 40 parts by weight or less.

When incorporating a complex of the platinum group element in the catalyst layer, both an organic complex and an inorganic complex can be used as the complex. Examples of the inorganic complex include $K_2[M(CN)_4]\cdot 3H_2O$, and $K_2MCl_4$ (where M is a platinum group element). However, there is a possibility that the ligand may adsorb to the fine catalyst particles and lower the catalyst performance. For this reason, in the present invention, it is preferable to use an organic complex, which is unlikely to cause such a problem. As the organic complex, it is preferable to use a platinum group element complex that is formed from the aforementioned organic compound having a ligand that forms a complex with a platinum group element, and more preferably an organic complex formed of a ligand containing at least oxygen as a coordinating atom and a platinum group element. Particularly, the organic complex preferably is a chelate compound in which a plurality of oxygen atoms are incorporated as coordinating atoms.

The platinum group element complexes may be used alone or in a combination of two or more. The content of the platinum group element complex in the catalyst layer preferably is 0.1 part by weight or more, more preferably 1 part by weight or more, and most preferably 5 parts by weight or more, relative to 100 parts by weight of the metal catalyst, in order to make the effect of the present invention more superior. In order not to lower the power generation performance, the content preferably is 50 parts by weight or less, more preferably 25 parts by weight or less, and most preferably 10 parts by weight or less.

Also, the inclusion of (C) carbon that does not support a metal catalyst in the catalyst layer can cause leached platinum group element ions to deposit on the surface of the carbon. This suppresses the leached catalyst metal ions from migrating to the polymer electrolyte membrane, and it is thus possible to prevent deposition of the metal in the polymer electrolyte membrane and the increase in the membrane resistance resulting from the deposition. The platinum group element particles deposited on the surface of the carbon can be used again as a catalyst, and it is thus possible to suppress the catalyst's substantial electrochemical surface area from decreasing.

As the carbon not supporting a metal catalyst, the larger the BET specific surface area it has, the more preferable it is, in order to facilitate the deposition reaction of leached metal catalyst onto the carbon surface. The BET specific surface area preferably is 100 m$^2$/g or greater, and more preferably 150 m$^2$/g or more.

In order to make the surface of the carbon such that the leached metal catalyst is easily deposited, the carbon preferably has an R value of Raman spectrum of 0.1 or greater, and more preferably 0.25 or greater. According to Raman spectroscopy using an argon laser, the R value represented by the ratio ($I_{1360}/I_{1580}$) of the peak intensity $I_{1360}$ (D band intensity that indicates the presence of defects) of the absorption band that appears at around 1360 cm$^{-1}$ to the peak intensity $I_{1580}$ (G band intensity that indicates crystallinity) of the absorption band that appears at around 1580 cm$^{-1}$ in a Raman spectrum indicates the ratio of edge surface to carbon surface. The larger the R value is, the higher the ratio of edge surface to carbon surface becomes, making it easier for the metal catalyst to deposit.

On the other hand, in order to enhance the oxidation resistance of the carbon not supporting a metal catalyst and maintain that effect over a long period of time, it is preferable that the carbon satisfies at least one of (i) an R value of Raman spectrum of 0.5 or less and (ii) a lattice spacing $d_{002}$ between (002) planes of 0.35 nm or less. The lattice spacing $d_{002}$ between (002) planes that is measured by X-ray diffractometry indicates the degree of graphitization. Carbon whose crystallinity increases as graphitization proceeds is difficult to be oxidized. For this reason, it is preferable that $d_{002}$ is 0.35 nm or less, and more preferably 0.345 nm or less. Carbon whose R value and $d_{002}$ both fall within the abovementioned ranges is more preferably used.

In the specification of the present application, the R value of the carbon is a value calculated from the ratio of the peak intensity at around 1360 cm$^{-1}$ to the peak intensity at around 1580 cm$^{-1}$ in a Raman spectrum obtained using a Raman spectrophotometer, RAMASCOPE (light source: Ar ion laser, wavelength: 514.5 nm, laser power: 20 mW) available from Renishaw plc.

Likewise, the BET specific surface area of the carbon used in this specification is a value obtained by a nitrogen adsorption method using a specific surface area measuring apparatus, Macsorb HM model-1201, available from Mountech Co., Ltd.

The content of the carbon not supporting a metal catalyst preferably is 1 part by weight or more, more preferably 5 parts by weight or more, and most preferably 20 parts by weight or more, relative to 100 parts by weight of the metal catalyst, in order to make the effect of the present invention more superior. In order not to lower the power generation performance, the content preferably is 60 parts by weight or less, more preferably 50 parts by weight or less, and most preferably 40 parts by weight or less.

The highly crystalline carbon that satisfies (i) an R value of Raman spectrum of 0.5 or less, or (ii) a lattice spacing $d_{002}$ between (002) planes of 0.35 nm or less can be obtained by, for example, subjecting acetylene black, ketjen black, furnace black or the like to a heat treatment at a high temperature such as 1000 to 3000° C. in an inert atmosphere, but a carbon material obtained through graphitization processing at such a high temperature usually has a small specific surface area, and as such, it is difficult to have the redeposition reaction of the leached metal catalyst to occur in the electrode. In addition, in the case of pulverizing graphite particles, it is difficult to obtain fine particles smaller than 1 μm, and it is thus impossible to obtain particles having a large specific surface area.

The carbon preferably used in the present invention that satisfies at least one of (i) and (ii) stated above and has a BET specific surface area as large as 100 m$^2$/g or greater can be obtained by, for example, the following method.

A liquid hydrocarbon having a carbon-to-hydrogen weight composition ratio of 12 or greater, namely for example, naphtha pyrolysate (ethylene heavy end) is subjected to a partial oxidation reaction in the presence of molecular oxygen and water vapor at a pressure of 10 to 80 atmospheres in a furnace heated to a temperature of approximately 1200 to 1450° C., obtaining carbon black. The obtained carbon black is dried at 300 to 900° C. in a nitrogen atmosphere, and further subjected to a heat treatment at 1000 to 3000° C. in an argon atmosphere. Thus, carbon particles having a $d_{002}$ of about 0.335 to 0.35 nm and a BET specific surface area of 100 m$^2$/g or greater can be obtained.

The carbon particles having an R value of 0.5 or lower and a BET specific surface area of 100 m$^2$/g or greater can be obtained by introducing a hydrocarbon, such as methane, butane or acetylene, together with hydrogen at a hydrogen-to-carbon atomic ratio of 4.5 or greater in a thermal plasma flow generated in a hybrid thermal plasma reactor in which a DC arc and a high frequency arc are superimposed, and setting the time during which the material stays in a temperature range of 3000 to 4000° C. of the thermal plasma flow to 0.2 millisecond or longer by adjusting the introducing position and the amount introduced. The carbon particles thus obtained have a $d_{002}$ of about 0.335 to 0.345 nm.

It is of course possible to use a commercially available carbon material that satisfies the above-described properties if obtainable.

The above-described (A) a complex-forming agent having a ligand that forms coordinate bonds with platinum group element ions and forms a complex, (B) a complex of a platinum group element, and (C) carbon not supporting a metal catalyst that are to be incorporated in the catalyst layer may be used alone or in a combination of two or more. However, in order to obtain a more superior effect, it is desirable to incorporate: at least one selected from (A) a complex-forming agent having a ligand that forms coordinate bonds with platinum group element ions and forms a complex and (B) a complex of a platinum group element; and (C) carbon not supporting a metal catalyst. This is because it is considered that the durability of the membrane electrode assembly can be further enhanced by causing the complex-forming agent or the complex to exist together with the carbon.

When using only one of (A) a complex-forming agent having a ligand that forms coordinate bonds with platinum group element ions and forms a complex, (B) a complex of a platinum group element and (C) carbon not supporting a metal catalyst, it is preferable to use the following additives so as to make the effect superior.

As the complex-forming agent, it is preferable to use (a) a complex-forming agent having a ligand that forms coordinate bonds with platinum group element ions and forms a complex, the ligand containing oxygen as a coordinating atom. As the complex, it is preferable to use (b) a complex of a platinum group element, a ligand of the complex containing oxygen as a coordinating atom. As the carbon, it is preferable to use (c) carbon that has a BET specific surface area of 100 m$^2$/g or greater, satisfies at least one of (i) an R value of Raman spectrum of 0.5 or less and (ii) a lattice spacing $d_{002}$ between (002) planes of 0.35 nm or less, and does not support a metal catalyst. It is sufficient to incorporate them in at least one of the catalyst layer of the oxygen electrode and the catalyst layer of the fuel electrode, but it is desirable to incorporate the additives of (A) to (C) in at least the catalyst layer of the oxygen electrode because the problem of metal catalyst oxidation is more likely to occur in the catalyst layer of the oxygen electrode.

As the metal catalyst used in the present invention, a material containing a platinum group element is preferably used: specifically, a simple substance of a platinum group element, an alloy made of platinum group elements, such as Pt, Pd, Pt—Ru alloy, Pt—Co alloy, or an alloy made of a platinum group element and an element other than the platinum group element (e.g., Fe, Co, Ni, Cu, Ag, Au, etc.). The metal catalyst may be a composite in which a surface layer made of a simple substance of a platinum group element, an alloy made of platinum group elements or an alloy made of a platinum group element and an element other than the platinum group element is formed on the surface of a core-forming material (e.g., Co, Ni, etc.). However, taking the power generation performance into account, it is preferable to use a material containing a platinum group element as a metal catalyst for both the catalyst layer of the oxygen electrode and the catalyst layer of the fuel electrode.

It is preferable that the metal catalyst has an average particle size of 1 nm to 50 nm in order to enhance the catalytic activity. In this specification, "average particle size" is a value obtained through measurement using a laser diffraction/scattering method.

As the supported catalyst supporting a metal catalyst, a carbon powder is typically used. Although there is no particular limitation on the physical property thereof, in order to cause the supported catalyst to support more metal catalyst, it is preferable to use, for example, a carbon powder having a low crystallinity and a large surface area, such as carbon black. However, because oxidation is less likely to occur as the crystallinity increases through graphitization, a carbon powder having the above-described R value and lattice spacing $d_{002}$ may be used.

Other elements of the membrane electrode assembly of the present invention can be those of conventionally known membrane electrode assemblies. For example, as the proton conductive polymer electrolyte contained in the catalyst layer of the oxygen electrode or the catalyst layer of the fuel electrode, a proton conductive polymer electrolyte that is typically used for a catalyst layer of a polymer electrolyte fuel cell can be used. Specific examples include resins having a sulfonic acid group such as polyperfluorosulfonic acid resin, sulfonated polyether sulfonic acid resin and sulfonated polyimide resin. Specific examples of polyperfluorosulfonic acid resin include Nafion® available from DuPont Corporation, Flemion® available from Asahi Glass Co. Ltd., and Aciplex (trade name) available from Asahi Kasei Corporation. The content of the proton conductive polymer electrolyte in the catalyst layer can be, for example, 2 to 200 parts by weight relative to 100 parts by weight of the supported catalyst supporting a metal catalyst.

The catalyst layer may further contain a resin binder. There is no particular limitation on the resin binder, but it is possible to use, for example, fluorocarbon resins such as polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (E/TFE), polyvinylidene fluoride (PVDF), and polychlorotrifluoroethylene (PCTFE); and non-fluorinated resins such as polyethylene, polypropylene, nylon, polystyrene, polyester, ionomer, butyl rubber, ethylene-vinyl acetate copolymer, ethylene-ethyl acrylate copolymer, and ethylene-acrylic acid copolymer. The content of the resin binder in the catalyst layer can be 0.01 to 100 parts by weight relative to 100 parts by weight of the supported catalyst supporting a metal catalyst.

Furthermore, a polymer electrolyte fuel cell of the present invention includes the aforementioned membrane electrode assembly of the present invention. Thus, it is possible to provide a polymer electrolyte fuel cell that has high durability and a long service life.

Hereinafter, an example of a membrane electrode assembly of the present invention and a polymer electrolyte fuel cell including the membrane electrode assembly will be described with reference to the drawings.

FIG. 1 is a schematic cross-sectional view of an example of a membrane electrode assembly of the present invention and a polymer electrolyte fuel cell including the membrane electrode assembly. In FIG. 1, a polymer electrolyte fuel cell 11 includes a membrane electrode assembly 10. The membrane electrode assembly 10 is configured with an oxygen electrode 1, a fuel electrode 2 and a polymer electrolyte membrane 3.

The oxygen electrode 1 and the fuel electrode 2 each include a catalyst layer 1b, 2b and a gas diffusion layer 1a, 2a. However, the oxygen electrode 1 and the fuel electrode 2 may be configured only with the catalyst layer 1b, 2b. As stated above, at least one of the catalyst layer 1b of the oxygen electrode 1 and the catalyst layer 2b of the fuel electrode 2 contains at least one selected from (A) a complex-forming agent having a ligand that forms coordinate bonds with platinum group element ions and forms a complex, (B) a complex of a platinum group element, and (C) carbon that does not support a metal catalyst. The gas diffusion layer 1a of the oxygen electrode 1 and the gas diffusion layer 2a of the fuel electrode 2 can be made of a porous electron conductive material or the like. For example, a water repellent porous carbon sheet or the like can be used.

For the purpose of improving the water repellency and the contact with the catalyst layer, a carbon powder paste that contains fluorocarbon resin particles (PTFE resin particles, etc.) may be applied onto the catalyst layer-side of the gas diffusion layer 1a of the oxygen electrode 1 and the catalyst layer-side of the gas diffusion layer 2a of the fuel electrode 2.

There is no particular limitation on the polymer electrolyte membrane 3 as long as it has proton conductivity and is made of a polymer material having no electron conductivity, and it is possible to use a membrane that is made of the same material as the aforementioned proton conductive polymer electrolyte. Other than the above, sulfuric acid-doped polybenzimidazole or the like can also be used as a material for the polymer electrolyte membrane 3.

The polymer electrolyte fuel cell 11 includes current collector plates 5 and 6 that are disposed at the outer side of the gas diffusion layer 1a of the oxygen electrode 1 and the gas diffusion layer 2a of the fuel electrode 2, respectively. The current collector plate 5 at the oxygen electrode 1 side is provided with pores 9 for admitting oxygen (air), and a lead member 5a is connected to the current collector plate 5. Likewise, the current collector plate 6 at the fuel electrode 2 side is provided with pores 7 for admitting fuel (hydrogen, etc.) from a fuel path 8, and a lead member 6a is connected to the current collector plate 6. The membrane electrode assembly 10 is sandwiched by the current collector plates 5 and 6, and then sealed with a sealant 4. In this manner, the polymer electrolyte fuel cell 11 is formed.

The current collector plates 4 and 5 can be made of, for example, a noble metal such as platinum or gold, a corrosion resistant metal such as stainless steel, a carbon material, or the like. In order to improve the corrosion resistance of these materials, the surface may be plated or coated.

FIG. 1 shows an example of the polymer electrolyte fuel cell 11 configured using a single unit cell for a fuel cell that was produced using the membrane electrode assembly 10. However, the polymer electrolyte fuel cell of the present invention can be configured also by connecting unit cells for a fuel cell in series or parallel in accordance with a conventional method.

The membrane electrode assembly 10 and the polymer electrolyte fuel cell 11 shown in FIG. 1 are merely an example of the present invention, and the membrane electrode assembly and the polymer electrolyte fuel cell of the present invention are not limited to those shown in FIG. 1. The membrane electrode assembly of the present invention can also be used in, other than a polymer electrolyte fuel cell that employs a hydrogen gas as fuel, for example, a fuel cell that employs a liquid fuel such as methanol.

Hereinafter, the present invention will be described in further detail with reference to examples. However, it is to be understood that the present invention is not limited to the following examples.

Example 1

A catalyst layer paste was prepared by adding 10 parts by weight of citric acid (available from Aldrich Chemical Co. Inc.) as a complex-forming agent to 100 parts by weight of platinum-supporting carbon (TEC10E50E available from Tanaka Kikinzoku Kogyo K.K., platinum-to-carbon black weight ratio: 50:50), in which platinum serving as a catalyst was supported on carbon black serving as a support, and 1200 parts by weight of polyperfluorosulfonic acid resin solution (Nafion available from Aldrich Chemical Co. Inc.) as a proton conductive polymer electrolyte, and thoroughly stirring them to uniformly disperse them. This catalyst layer paste was applied onto a polyamide sheet such that the amount of platinum catalyst applied would be 0.5 mg/cm$^2$. After drying, the sheet was cut into a 3 cm by 3 cm square, producing an oxygen electrode (oxygen electrode catalyst layer). Likewise, a fuel electrode (fuel electrode catalyst layer) was produced in the same manner as the oxygen electrode was produced, except that citric acid was not added and the amount of platinum catalyst applied was changed to 0.3 mg/cm$^2$.

Next, a polyperfluorosulfonic acid resin membrane (Nafion 112 available from DuPont Corporation) was interposed between the oxygen electrode and the fuel electrode as a polymer electrolyte membrane, and they were bonded by hot pressing. Afterward, the sheets attached to the oxygen electrode and the fuel electrode were removed, thereby obtaining a membrane electrode assembly.

Then, 415 μm thick carbon paper (available from SGL carbon Co., Ltd.) was disposed on the oxygen electrode and the fuel electrode as diffusion layers, and the resultant was sandwiched by 2 mm thick stainless steel current collector plates plated with gold. Thus, a unit cell for a fuel cell was produced.

Example 2

A unit cell for a fuel cell was produced in the same manner as in Example 1, except that 10 parts by weight of ethylenediaminetetraacetic acid (EDTA available from Dojindo Laboratories) was used in place of citric acid.

Example 3

A unit cell for a fuel cell was produced in the same manner as in Example 1, except that 10 parts by weight of acetylacetone (available from Wako Pure Chemical Industries, Ltd.) was used in place of citric acid.

Example 4

A unit cell for a fuel cell was produced in the same manner as in Example 1, except that 100 parts by weight of platinum-cobalt-supporting carbon (TEC35E51 available from Tanaka Kikinzoku Kogyo K.K., platinum cobalt alloy-to-carbon black weight ratio: 50:50), in which a platinum-cobalt alloy (platinum-to-cobalt weight ratio: 94:6) serving as a catalyst was supported on carbon black serving as a support, was used in place of the platinum-supporting carbon.

Example 5

A unit cell for a fuel cell was produced in the same manner as in Example 4, except that 10 parts by weight of EDTA (available from Dojindo Laboratories) was used in place of citric acid.

Example 6

A unit cell for a fuel cell was produced in the same manner as in Example 4, except that 10 parts by weight of acetylacetone (available from Wako Pure Chemical. Industries, Ltd.) was used in place of citric acid.

Example 7

A unit cell for a fuel cell was produced in the same manner as in Example 3, except that the amount of acetylacetone added was changed to 5 parts by weight, 20 parts by weight and 40 parts by weight.

Comparative Example 1

A unit cell for a fuel cell was produced in the same manner as in Example 1, except that citric acid was not added to the catalyst layer of the oxygen electrode.

Reference Example 1

A unit cell for a fuel cell was produced in the same manner as in Example 1, except that 10 parts by weight of phenanthroline was used in place of citric acid.

Reference Example 2

A unit cell for a fuel cell was produced in the same manner as in Example 1, except that 10 parts by weight of porphyrin was used in place of citric acid.

Reference Example 3

A unit cell for a fuel cell was produced in the same manner as in Example 1, except that 10 parts by weight of phthalocyanine was used in place of citric acid.

The complex-forming agents used in Reference Examples 1 to 3 described above are compounds whose nitrogen in a molecule forms coordinate bonds with platinum ions, forming a complex of platinum.

The unit cells for a fuel cell produced in Examples 1 to 7, Comparative Example 1 and Reference Examples 1 to 3 described above were evaluated for durability in terms of catalyst leaching and redeposition according to the following process.

Hydrogen humidified to saturation was supplied to the fuel electrode, and the oxygen electrode was subjected to nitrogen substitution. After that, an acceleration test for catalyst leaching and redeposition was performed by cyclic voltammetry. An operation in which a potential was swept within a range from 0.05 to 1.2 V (with respect to normal hydrogen electrode (NHE), potential sweep rate: 50 mV/s) was defined as one cycle. This cycle was repeated 5000 times. In this test, the output density of the initial cycle (after the first cycle) and the output density after 5000 cycles for a unit cell for a fuel cell were determined from a current value at which the voltage of the unit cell reached 0.65 V. Then, the rate of the output density after 5000 cycles to the output density of the initial cycle was evaluated as the output density retention rate. Furthermore, the ohmic resistance of the unit cell was measured after the initial cycle and 5000 cycles by the four-terminal alternating current impedance measurement using a frequency response analyzer FRA-1255B available from Solartron Metrology Ltd. Then, the rate of the amount of change in the ohmic resistance after 5000 cycles to the ohmic resistance of the initial cycle was evaluated as the ohmic resistance change rate. The result of the durability evaluation is shown in Table 1.

TABLE 1

| | Additive | | Output density retention rate (%) | Ohmic resistance change rate (%) |
|---|---|---|---|---|
| | Complex-forming agent | Amount added relative to 100 parts by weight of supported catalyst of metal catalyst | | |
| Example 1 | Citric acid | 10 parts by weight | 82 | 0 |
| Example 2 | EDTA | 10 parts by weight | 79 | 0 |
| Example 3 | Acetylacetone | 10 parts by weight | 84 | 0 |

TABLE 1-continued

| | Additive | | | |
|---|---|---|---|---|
| | Complex-forming agent | Amount added relative to 100 parts by weight of supported catalyst of metal catalyst | Output density retention rate (%) | Ohmic resistance change rate (%) |
| Example 4 | Citric acid | 10 parts by weight | 92 | 0 |
| Example 5 | EDTA | 10 parts by weight | 90 | 0 |
| Example 6 | Acetylacetone | 10 parts by weight | 95 | 0 |
| Example 7 | Acetylacetone | 5 parts by weight | 84 | 0 |
| | | 20 parts by weight | 90 | 0 |
| | | 40 parts by weight | 79 | 5 |
| Comp. Ex. 1 | — | None | 42 | 24 |
| Ref. Ex. 1 | Phenanthroline | 10 parts by weight | 65 | 7 |
| Ref. Ex. 2 | Porphyrin | 10 parts by weight | 53 | 6 |
| Ref. Ex. 3 | Phthalocyanine | 10 parts by weight | 54 | 0 |

Figure 2:
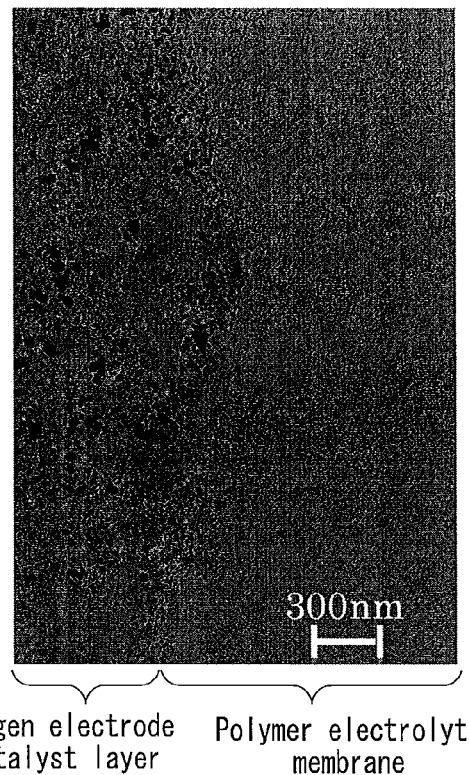
FIG. 2 is a transmission electron microscope image of a cross section of a membrane electrode assembly of Example 1 after an acceleration test.
Figure 3:
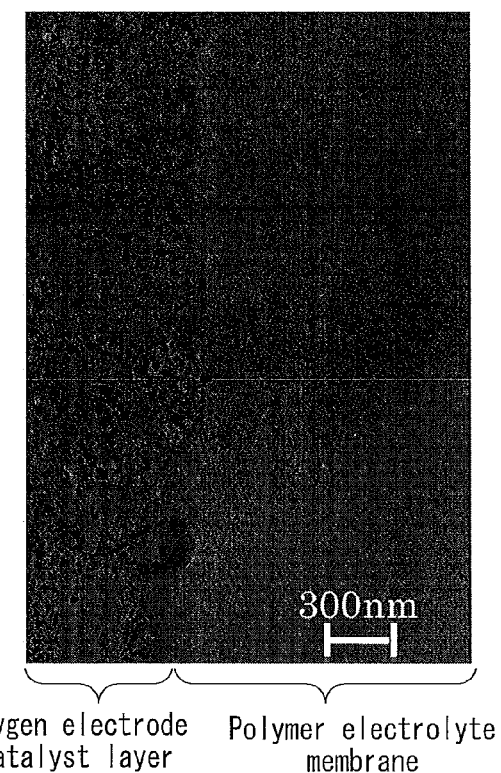
FIG. 3 is a transmission electron microscope image of a cross section of a membrane electrode assembly of Example 3 after an acceleration test.
Figure 4:
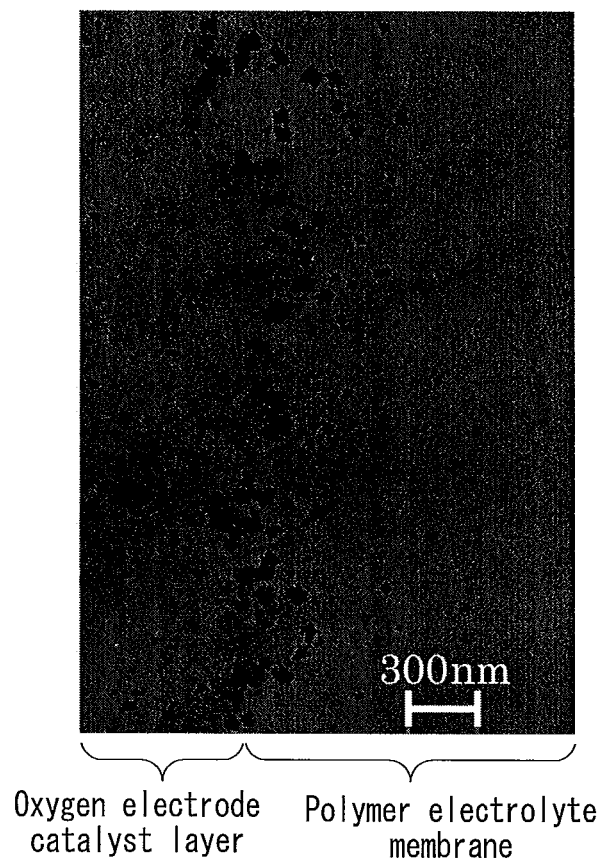
FIG. 4 is a transmission electron microscope image of a cross section of a membrane electrode assembly of Comparative Example 1 after an acceleration test.

After the acceleration test, cross sections of the membrane electrode assemblies of Examples 1 and 3, and Comparative Example 1 were observed with a transmission electron microscope. The transmission electron microscope images are shown in FIGS. 2 to 4. In Example 1 (FIG. 2) and Example 3 (FIG. 3), redeposited fine metal catalyst particles were not observed in the polymer electrolyte membranes. In contrast, in Comparative Example 1 (FIG. 4), the presence of many fine metal catalyst particles redeposited in the polymer electrolyte membrane was observed. In Examples 1 and 3 in which a complex-forming agent was incorporated in the catalyst layer, it is considered that the complex-forming agent formed coordinate bonds with leached platinum ions, forming a complex, and thereby it was possible to suppress the diffusion of the platinum ions to the polymer electrolyte membrane. For this reason, as shown in Table 1, for the fuel cells of Examples 1 to 7, the output density retention rate after being cycled improved significantly as compared to that of Comparative Example 1 in which the catalyst layer did not contain a complex-forming agent. Also, the ohmic resistance change rate lowered significantly, and it was possible to maintain superior properties over a long period of time.

Furthermore, comparison between Examples 1 to 6 and Reference Examples 1 to 3 indicates that a particularly superior effect can be obtained when the complex-forming agent contains at least oxygen as a coordinating atom.

Example 8

An oxygen electrode (oxygen electrode catalyst layer) was produced in the same manner as in Example 1, except that 10 parts by weight of platinum acetylacetonate, which is a platinum complex, was added in place of citric acid, and the amount of platinum catalyst applied was changed to 0.55 mg/cm². A fuel electrode (fuel electrode catalyst layer) was produced in the same manner as the oxygen electrode was produced, except that platinum acetylacetonate was not added, and the amount of platinum catalyst applied was changed to 0.3 mg/cm². Then, a unit cell for a fuel cell was produced in the same manner as in Example 1, except that the oxygen electrode and fuel electrode thus obtained were used.

Example 9

A unit cell for a fuel cell was produced in the same manner as in Example 8, except that the amount of platinum acetylacetonate added was changed to 4 parts by weight.

Example 10

A unit cell for a fuel cell was produced in the same manner as in Example 8, except that 100 parts by weight of the platinum-cobalt-supporting carbon used in Example 4 was used in place of the platinum-supporting carbon.

Example 11

A unit cell for a fuel cell was produced in the same manner as in Example 8, except that 10 parts by weight of acetylacetone was added in place of platinum acetylacetonate.

Comparative Example 2

A unit cell for a fuel cell was produced in the same manner as in Example 8, except that citric acid and platinum acetylacetonate were not added to the catalyst layer of the oxygen electrode.

The unit cells for a fuel cell produced in Examples 8 to 11 and Comparative Example 2 described above were subjected to the aforementioned acceleration test using cyclic voltammetry to determine an output density retention rate after 5000 cycles. The result is shown in Table 2.

TABLE 2

| | Additive | | |
|---|---|---|---|
| | Compound | Amount added relative to 100 parts by weight of supported catalyst of metal catalyst | Output density retention rate (%) |
| Example 8 | Platinum acetylacetonate | 10 parts by weight | 90 |
| Example 9 | | 4 parts by weight | 90 |
| Example 10 | | 10 parts by weight | 98 |
| Example 11 | Acetylacetone | 10 parts by weight | 85 |
| Comp. Ex. 2 | — | None | 55 |

As can be seen from Table 2, for the fuel cells of Examples 8 to 10 in which a platinum complex was included in the catalyst layer, the output density retention rate after being cycled improved significantly as compared to the fuel cell of Comparative Example 2 containing no additive, and it was possible to maintain superior properties over a long period of time.

Furthermore, comparison between Examples 8 and 11 indicates that a more superior effect can be obtained when a complex of platinum with a complex-forming agent is added than when a complex-forming agent capable of forming a complex of platinum is added.

Example 12

A catalyst layer paste was prepared by adding 20 parts by weight of carbon powder (R value: 0.3, $d_{002}$: 0.345 nm (graphitized carbon), BET specific surface area: 133 m²/g) available from Showa Denko K. K. as carbon not supporting a metal catalyst to 100 parts by weight of the platinum-supporting carbon used in Example 1 and 1200 parts by weight of the polyperfluorosulfonic acid resin solution used in Example 1, and thoroughly stirring them to uniformly disperse them. The amount of the carbon not supporting a metal catalyst was 40 parts by weight relative to 100 parts by weight of the platinum catalyst in the catalyst layer paste. This catalyst layer paste was applied onto a polyimide sheet such that the amount of platinum catalyst applied would be 0.5 mg/cm². After drying, the sheet was cut into a 3 cm by 3 cm square, producing an oxygen electrode (oxygen electrode catalyst layer). Likewise, a fuel electrode (fuel electrode catalyst layer) was produced in the same manner as the oxygen electrode was produced, except that the carbon not supporting a metal catalyst was not added, and the amount of platinum catalyst applied was changed to 0.3 mg/cm². A unit cell for a fuel cell was produced in the same manner as in Example 1, except that the oxygen electrode and fuel electrode thus obtained were used.

Example 13

A unit cell for a fuel cell was produced in the same manner as in Example 12, except that 100 parts by weight of platinum alloy-supporting carbon (available from N.E. Chemcat Corporation, platinum alloy composition: Pt/Co/Cr=91/7/2 (weight ratio)) was used in place of the platinum-supporting carbon.

Example 14

A unit cell for a fuel cell was produced in the same manner as in Example 12, except that 10 parts by weight of carbon black (Ketjen Black-EC 300J available from LION Corporation, R value: 1.2, $d_{002}$: 0.36 nm, BET specific surface area: 800 m²/g) was used as carbon not supporting a metal catalyst in place of the carbon powder of Showa Denko K. K., and 10 parts by weight of citric acid (available from Aldrich Chemical Co. Inc.) was added to the catalyst layer paste.

Example 15

A unit cell for a fuel cell was produced in the same manner as in Example 14, except that 10 parts by weight of EDTA (available from Dojindo Laboratories) was used in place of citric acid.

Example 16

A unit cell for a fuel cell was produced in the same manner as in Example 14, except that 10 parts by weight of acetylacetone (available from Wako Pure Chemical Industries, Ltd.) was used in place of citric acid.

Example 17

A unit cell for a fuel cell was produced in the same manner as in Example 14, except that 10 parts by weight of citric acid was added without adding carbon not supporting a metal catalyst to the catalyst layer of the oxygen electrode.

Comparative Example 3

A unit cell for a fuel cell was produced in the same manner as in Example 12, except that carbon not supporting a metal catalyst was not added to the catalyst layer of the oxygen electrode.

Reference Example 4

A unit cell for a fuel cell was produced in the same manner as in Example 12, except that 10 parts by weight of carbon black (Ketjen Black-EC 300J available from LION Corporation, R value: 1.2, $d_{002}$: 0.36 nm, BET specific surface area: 800 m²/g) was used as carbon not supporting a metal catalyst in place of the carbon powder of Showa Denko K. K.

Reference Example 5

A unit cell for a fuel cell was produced in the same manner as in Reference Example 4, except that the amount of carbon black added was changed to 20 parts by weight. That is, the unit cells for a fuel cell of Example 12 and Reference Example 5 have the same configuration except that different types of carbon are used as carbon not supporting a metal catalyst.

The unit cells for a fuel cell produced in Examples 12 to 17, Comparative Example 3 and Reference Example 4 were subjected to the aforementioned acceleration test for catalyst leaching by cyclic voltammetry. Based on cyclic voltammograms after the initial cycle and 5000 cycles, the amount of electricity involved in hydrogen desorption: $Q_H$ (C) was determined from the area. Based on the amount of electricity corresponding to hydrogen desorption per unit area of platinum: 210 µC/cm² and the weight of platinum: M (g), the electrochemical surface area (ECSA) per gram of the catalyst was calculated using the following equation.

$$ECSA(m^2/g\text{-}Pt)=Q_H/(210\times10000\times M)$$

Next, ECSA retention rate after 5000 cycles was determined relative to the ECSA of the initial cycle so as to evaluate the ratio of the catalyst that can effectively function even after 5000 cycles. The output density retention rate after 5000 cycles was also determined in the same manner as described above. The result is shown in Table 3.

TABLE 3

| | Additive | | Acceleration test for catalyst leaching | |
|---|---|---|---|---|
| | Complex-forming agent | Carbon not supporting metal catalyst | Output density retention rate (%) | ECSA retention rate (%) |
| Example 12 | — | Graphitized carbon | 77 | 24 |
| Example 13 | — | Graphitized carbon | 98 | 75 |
| Example 14 | Citric acid | Carbon black | 83 | 28 |
| Example 15 | EDTA | Carbon black | 88 | 26 |
| Example 16 | Acetylacetone | Carbon black | 83 | 27 |
| Example 17 | Citric acid | — | 71 | 16 |
| Comp. Ex. 3 | — | — | 66 | 13 |
| Ref. Ex. 4 | — | Carbon black | 80 | 26 |

As can be seen from Table 3, for the fuel cells of Examples 12 to 16 and Reference Example 4 in which carbon not supporting a metal catalyst was incorporated in the catalyst layer, the electrochemical surface area retention rate improved as compared to the fuel cell of Comparative Example 3 in which the catalyst layer contained no additive, and the fuel cell of Example 17 in which only a complex-forming agent was incorporated. Presumably, this is because leached platinum ions deposited again on the carbon not supporting a metal catalyst, and started functioning as a catalyst, and thus the reduction of the electrochemical surface area was suppressed. For this reason, for the fuel cells of Examples 12 to 16 and Reference Example 4, the output density retention rate after 5000 cycles improved. Also, for Examples 14 to 16 in which both a complex-forming agent and carbon not supporting a metal catalyst were incorporated, the output density retention rate further increased as compared to Example 17 in which only a complex-forming agent was added and Reference Example 4 in which only carbon not supporting a metal catalyst was added.

Furthermore, the unit cells for a fuel cell of Examples 12 and 13 and Comparative Example 3 and Reference Example 5 were subjected to an acceleration test for carbon oxidation performed by the following process. Unit cells for a fuel cell different from those used in the aforementioned acceleration test for catalyst leaching were used. Both the oxygen electrode and the fuel electrode were allowed to stand in the atmosphere, and after that, a voltage was applied to the unit cell such that the potential of the oxygen electrode would be 0.85 V relative to that of the fuel electrode. This state was maintained for three hours. In this acceleration test, air and hydrogen were supplied to the oxygen electrode and the fuel electrode, respectively, to cause power generation before and after the test, and the output density of the unit cell before and after the test was determined from a current value at which the voltage of the unit cell reached 0.65 V. Then, the rate of the output density after the test to the output density before the test was evaluated as output density retention rate. The unit cell for a fuel cell of Reference Example 5 was further subjected to the acceleration test for catalyst leaching in the same manner as described above. The result is shown in Table 4.

TABLE 4

| | Additive Carbon not supporting metal catalyst | Acceleration test for catalyst leaching | | Acceleration test for carbon oxidation Output density retention rate (%) |
|---|---|---|---|---|
| | | Output density retention rate (%) | ECSA retention rate (%) | |
| Example 12 | Graphitized carbon | 77 | 24 | 62 |
| Example 13 | Graphitized carbon | 98 | 75 | 100 |
| Comp. Ex. 3 | — | 66 | 13 | 47 |
| Ref. Ex. 5 | Carbon black | 83 | 36 | 54 |

As can be seen from Table 4, for the fuel cells of Examples 12 and 13 in which the catalyst layer contained highly crystalline carbon that had a BET specific surface area of not less than 100 m$^2$/g and did not support a metal catalyst, the durability for carbon oxidation was enhanced as compared to the fuel cell of Comparative Example 3 in which the catalyst layer did not contain the carbon and the fuel cell of Reference Example 5 in which carbon having a BET specific surface area of not less than 100 m$^2$/g but a low crystallinity was incorporated, and it was possible to suppress the reduction of the output density under conditions in which carbon is oxidized. Because the carbon used in the fuel cell of Reference Example 5 had a very large BET specific surface area of 800 m$^2$/g and leached metal was deposited easily, the output density retention rate was higher than that of the fuel cell of Example 12 in the acceleration test for catalyst leaching, but since it is easily oxidized, it is desirable to use highly crystalline carbon that satisfies at least one of (i) an R value of Raman spectrum of 0.5 or less and (ii) a lattice spacing $d_{on}$ between (002) planes of 0.35 nm or less in order to maintain high power generation performance for a long period of time.

The present invention may be embodied in other forms without departing from the spirit or essential characteristics thereof. The embodiments disclosed in this application are to be considered as illustrative and not restrictive. The scope of the present invention should be construed in view of the appended claims, rather than the foregoing description, and all changes that come within the meaning and range of equivalency of the claims are intended to be embraced therein.

INDUSTRIAL APPLICABILITY

As described above, according to the present invention, it is possible to maintain a membrane electrode assembly's high power generation performance for a long period of time, and provide a polymer electrolyte fuel cell that has high durability and a long service life. The polymer electrolyte fuel cell of the present invention has a wide range of applications such as a cogeneration system for consumer use, an electric power generator for mobile units such as automobiles, and a portable power source.

The invention claimed is:

1. A membrane electrode assembly comprising: an oxygen electrode including a catalyst layer for reducing oxygen, a fuel electrode including a catalyst layer for oxidizing fuel, and a polymer electrolyte membrane interposed between the oxygen electrode and the fuel electrode,
   wherein at least one of the catalyst layer of the oxygen electrode and the catalyst layer of the fuel electrode includes:
   carbon supporting a metal catalyst containing a platinum group element;
   a proton conductive polymer electrolyte; and
   at least one selected from (a) a complex-forming agent having a ligand that forms coordinate bonds with ions of the platinum group element and forms a complex, the ligand containing oxygen as a coordinating atom, (b) a complex of the platinum group element, a ligand of the complex containing oxygen as a coordinating atom, and (c) carbon that does not support the metal catalyst, the carbon having a BET specific surface area of 100 m$^2$/g or greater, an R value of Raman spectrum of 0.1 or greater and a lattice spacing $d_{002}$ between (002) planes of 0.35 nm or less.

2. The membrane electrode assembly according to claim 1, wherein at least one of the catalyst layer of the oxygen electrode and the catalyst layer of the fuel electrode includes the complex-forming agent, and the complex-forming agent is a compound having a carbonyl group or phosphoryl group.

3. The membrane electrode assembly according to claim 2, wherein the compound having a carbonyl group is at least one selected from the group consisting of acetylacetone, derivatives thereof, citric acid, acetyltributyl citrate, ammonium citrate, ethylenediaminetetraacetic acid, nitrilotriacetic acid, hydroxyethyliminodiacetic acid, hydroxyethylethylenediaminetriacetic acid, diethylenetriaminepentaacetic acid, triethylenetetraminehexaacetic acid, 1,3-propanediaminetetraacetic acid, 1,3-diamino-2-hydroxypropanetetraacetic acid, glycine, and dihydroxyethylglycine.

4. The membrane electrode assembly according to claim 2, wherein the compound having a phosphoryl group is at least one selected from the group consisting of hydroxyethylidenediphosphonic acid, nitrilotrismethylenephosphonic acid, phosphonobutanetricarboxylic acid, and N,N,N',N'-tetrakis(phosphonomethyl)ethylene diamine.

5. The membrane electrode assembly according to claim 1, wherein at least one of the catalyst layer of the oxygen electrode and the catalyst layer of the fuel electrode includes the complex-forming agent, and the content of the complex-forming agent is 1 part by weight or more and 50 parts by weight or less, relative to 100 parts by weight or the carbon supporting the metal catalyst.

6. The membrane electrode assembly according to claim 1, wherein at least one of the catalyst layer of the oxygen electrode and the catalyst layer of the fuel electrode includes the platinum group element complex, and the content of the platinum group element complex is 0.1 part by weight or more and 50 parts by weight or less, relative to 100 parts by weight of the metal catalyst.

7. The membrane electrode assembly according to claim 1, wherein at least one of the catalyst layer of the oxygen electrode and the catalyst layer of the fuel electrode includes the carbon not supporting the metal catalyst, and the content of the carbon is 1 part by weight or more and 60 parts by weight or less, relative to 100 parts by weight of the metal catalyst.

8. A membrane electrode assembly comprising: an oxygen electrode including a catalyst layer for reducing oxygen, a fuel electrode including a catalyst layer for oxidizing fuel, and a polymer electrolyte membrane interposed between the oxygen electrode and the fuel electrode,
wherein at least one of the catalyst layer of the oxygen electrode and the catalyst layer of the fuel electrode includes:
carbon supporting a metal catalyst containing a platinum group element;
a proton conductive polymer electrolyte;
at least one selected from (A) a complex-forming agent having a ligand that forms coordinate bonds with ions of the platinum group element and forms a complex, and (B) a complex of the platinum group element; and
(C) carbon that does not support the metal catalyst, the carbon having an R value of Raman spectrum of 0.1 or greater and a lattice spacing $d_{002}$ between (002) planes of 0.35 nm or less.

9. The membrane electrode assembly according to claim 8, wherein the carbon not supporting the metal catalyst has an R value of Raman spectrum of 0.5 or less.

10. The membrane electrode assembly according to claim 8, wherein the carbon not supporting the metal catalyst has a lattice spacing $d_{002}$ between (002) planes of 0.345 nm or less.

11. A polymer electrolyte fuel cell comprising the membrane electrode assembly according to claim 1.

12. A polymer electrolyte fuel cell comprising the membrane electrode assembly according to claim 8.

13. The membrane electrode assembly according to claim 8, wherein the carbon that does not support the metal catalyst has a BET specific surface area of 100 $m^2/g$ or greater.

* * * * *